Dec. 25, 1956     C. H. FLUBACKER     2,775,678
ICE DETECTING PROBE
Filed Dec. 13, 1954
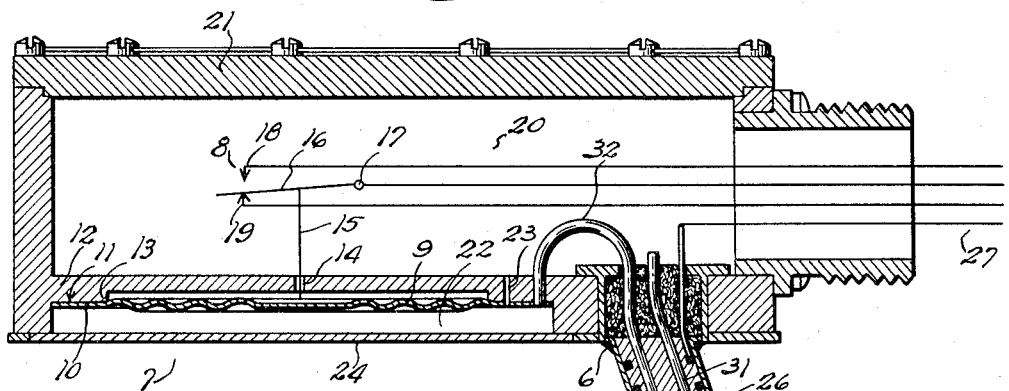
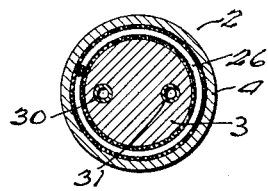
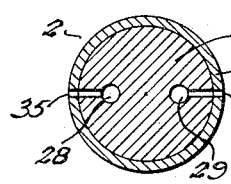
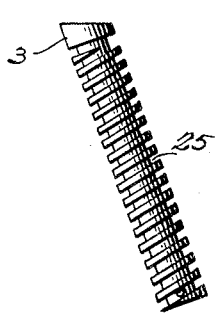
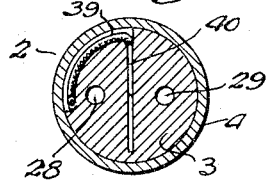
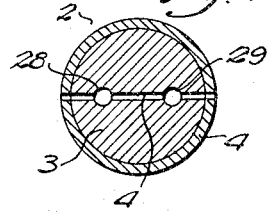
INVENTOR.
Charles H. Flubacker
BY
Thiess, Olson, Mecklenburger, von Holst & Coltman
Attys.

007 # United States Patent Office 2,775,678
Patented Dec. 25, 1956

2,775,678

ICE DETECTING PROBE

Charles H. Flubacker, Chicago, Ill., assignor to Cook Electric Company, Chicago, Ill., a corporation of Illinois Application December 13, 1954, Serial No. 474,841

6 Claims. (Cl. 219—19)

This invention relates to ice detecting probes and more particularly to a new and improved structure adapted for use in detecting the formation of ice upon moving vehicles such as airplanes or the like.

The invention is directed specifically to the probe structure which has been disclosed and described by me in my copending application Serial No. 458,440, filed September 27, 1954.

I have pointed out in this copending application that it is necessary to effect quick deicing of the probe, preferably in a few seconds, for satisfactory operation of a deicing system and for proper safety of an airplane in flight. In one form of a probe embodying the invention disclosed herein, a differential pressure switch may be employed to operate a heating circuit for the probe. The probe is preferably subjected to an impact pressure, which is proportional to the air velocity created and which is vented to a diaphragm of the differential pressure switch. The formation of ice is relied upon to cause failure of the impact pressure and thereby to cause an immediate operation of the differential pressure switch whereby the heating circuit is operated to clear the ice from the probe and to indicate thereby a continuing icing condition, if such should exist. To effect this quick deicing, the heater should be of substantial capacity and not remain energized for a long period. If the heater remains energized for a long period, burning out of the heating coil and damaging of the probe as well as surrounding equipment will occur. Generally, it is not satisfactory to place the heating coil under a separate circuit control because it is desirable to keep the deicing system under the control of the master switch of the airplane, which assures that the deicing system will be in operation whenever the airplane is in flight.

It is an object of this invention to provide a new and improved structure for the probe of a deicing system that is simple and effective and capable of accurate operation over a substantial period of time.

A further object of the invention resides in the arrangement of parts and their assembly whereby a heating coil may be novelly embedded in the probe but so carried as to be in close proximity to the outer shell and therefore capable of transferring the heat developed by the current flow therethrough to the surface of the probe in minimum time. As the result of the arrangement and construction of these parts, it is only necessary for the current to flow through the heating coil for a few seconds in order for the heat developed to be transferred to the probe surface and to melt the ice formed thereon. A further feature of this arrangement of parts and their assembly is that a heating coil of substantial capacity may be used without danger of excessive heating and damage to the other parts.

A further object of the invention is to provide in an improvement of this kind a few simple parts that can be precision made and accurately assembled in a simple and inexpensive manner and assure positive performances over a long period of time.

Other objects and advantages of the invention will be apparent from the following detail description when taken in connection with the accompanying drawing in which:

Figure 1 is a vertical transverse section of the probe and its mounting which includes the differential pressure switch adapted to operate the heating circuit;

Fig. 2 is a sectional view of the probe taken along line 2—2 of Fig. 1 and looking in the direction of the arrows;

Fig. 3 is a similar view but taken along line 3—3 of Fig. 1 and looking in the direction of the arrows;

Fig. 4 is a detail view of the core of the probe;

Fig. 5 is a sectional view of the probe taken along line 5—5 of Fig. 3 and looking in the direction of the arrows; and Fig. 6 is a similar view but taken along line 6—6 of Fig. 1 and looking in the direction of the arrows.

Referring now to the drawing, probe 2 comprises a core 3, a housing sleeve 4 and an end plate 5. Sleeve 4 is of a relatively thin wall structure and snugly fits about core 3. As will be noted in Fig. 1, sleeve 4 is adapted to be brazed or welded at 6 or otherwise secured to a housing 7 adapted to carry a differential pressure switch 8. It will be understood that probe 2 may be attached to this housing 7 in any suitable manner and project therefrom into the stream of air created by the movement of the airplane while in flight.

Differential pressure switch 8 includes a diaphragm 9 suitably sealed at its periphery 10 to a surface 11 of a wall 12. Surface 11 comprises the face of a raised annular shoulder 13. Wall 12 is provided with a central opening 14 through which extends a pin or rod 15 secured at one end to the diaphragm 9 and at the other end to a movable switch arm 16 suitably pivoted as at 17, it being understood that this particular construction may vary according to the requirements of a particular installation. Switch arm 16 is adapted to swing back and forth to engage either a contact 18 or a contact 19, this depending upon the position of diaphragm 9. Compartment 20 is closed off by a cover 21 suitably secured to housing 7. Chamber 22 may be closed off by a cover 24 likewise secured to housing 7. A small bleed passage 23 is provided in wall 12 to place chamber 22 in communication with compartment 20 so that the pressure in chamber 22 and compartment 20 will equalize when impact pressure at the ice forming surface of probe 2 fails.

Core 3 of probe 2 is preferably in the form of a rod having a helical groove 25 cut in its periphery to receive a wire 26 of the heating circuit designated broadly as 27. Sleeve 4 of relatively thin wall structure is adapted to enclose core 3 and uniquely keep heating wire 26 securely disposed within the groove 25. Disposing heating wire 26 in probe 2 in this manner permits a uniform cutting of helical groove 25 by mounting this core in a lathe with the cutting tool set to cut groove 25. A further advantage lies in the fact that heating wire 26 is thereby disposed in close proximity to the housing sleeve so as to effect transfer of the heat in minimum time.

Core 3 is also provided with two longitudinal passages 28 and 29 that may be drilled lengthwise of the core 3. This permits the insertion of two tubes 30 and 31 to extend partway therein and be led out through the mounting so that tube 30 may be curved as at 32 to extend through wall 12 of housing 7 into chamber 22, while tube 31 may continue into compartment 20 and communicate therewith. Plate 5 may be tightly seated against the outer tip of the probe and held firmly in sealed position by being brazed or welded.

Lead edge 34 is provided with a plurality of transverse passages 35 while trailing edge 36 is provided with a plurality of perforations 37. Perforations 35 and 37 are formed by cutting the same after the core 3 is inserted in housing sleeve 4. It will be observed that heating wire 26 is stripped of its insulation at the end of its last turn, as indicated at 39 in Fig. 5, so that the bare end 40 may be securely anchored transversely in core 3 to establish a perfect ground for the return side of the heating circuit.

It will be apparent that movement of probe 2 in an air stream causes an impact pressure at apertures 35 of leading edge 34 of probe 2, which impact pressure will impose a pressure on the underside of diaphragm 9 in excess of the pressure in compartment 20 which communicates through hole 14 with the opposite side of diaphragm 9. This impact pressure will flex diaphragm 9 upwardly and swing contact arm 16 into engagement with contact 18. As disclosed in my aforesaid copending application, this will immediately establish an arming circuit which continues closed as long as impact pressure is imposed upon apertures 35 and diaphragm 9. If climatic conditions are conducive to ice formation during flight of the airplane, ice will form upon leading edge 34 of probe 2. This ice formation will block apertures 35 and pressure existing at the time in passage 28 and chamber 22 will equalize with the pressure in compartment 20 by reason of the bleed passages 23 and 41, the latter being provided between passages 28 and 29 near the lower end thereof. This equalization of pressure returns diaphragm 9 to its original position and brings switch arm 16 into engagement with contact 19. Closing the circuit at contact 19 closes the heating circuit 27 which includes, of course, the heating wire 26. Heating wire 26 is of substantial capacity, preferably in the neighborhood of 200 watts or so, in order to effect melting of ice formation on the surface of probe 2 within a short period, say, for example, of five seconds or so. This immediately restores impact pressure at apertures 35, in passage 28 and in chamber 22. Promptly, diaphragm 9 operates switch arm 16 to a position engaging contact 18. Thus, the heating circuit 27 will open and will remain open until ice formation again covers apertures 35. Again, diaphragm 9 will move contact 16 to engage contact 19 and close heating circuit 27. Again, the heating circuit functions to melt the ice within the desired period. The heating circuit will again be open at contact 19 through the restoration of impact pressure at apertures 35 and in chamber 22.

An ice detecting probe is disclosed that is simple to make and effectively responds when an icing condition occurs on the surface of an airplane in flight. The construction of the probe permits the use of a heater of substantial capacity in relatively close proximity to a surface on which this icing condition occurs. The ice will be melted within a few seconds and the heating circuit opened to prevent it from being burned out and to prevent other damage occurring. If the icing condition continues, the heating circuit is again closed to melt the same from the probe. This cycle will repeat itself as long as the icing condition continues. A proper circuit may be used in connection with the probe so as to indicate to the pilot that his ship is being subjected to a continuous icing condition.

Without further elaboration, the foregoing will so fully explain the character of my invention that others may, by applying current knowledge, readily adapt the same for use under varying conditions of service, without eliminating certain features, which may properly be said to constitute the essential items of novelty involved, which items are intended to be defined and secured to me by the following claims:

I claim:

1. An ice detecting probe having trailing and leading edges adapted to be projected into an air stream comprising a housing sleeve provided with openings exposed to said leading and trailing edges thereof, a core snugly fitting in said housing sleeve, said core having longitudinal passages therein in communication with said openings and a continuous groove cut lengthwise in its peripheral surface, and an electric heating coil in said groove.

2. An ice detecting probe adapted to be projected into an air stream comprising a housing sleeve having openings therein, a core snugly fitting said housing sleeve, said core having a continuous helical groove cut in its peripheral surface and longitudinal passages therein communicating with said sleeve openings, an electric heating coil in said groove in close proximity to said housing sleeve and said core to instantaneously heat both said sleeve and said core to melt formation of ice on the exterior of said sleeve or in said longitudinal passages.

3. An ice detecting probe adapted to be projected into an air stream comprising a mounting, a housing sleeve extending therefrom, a core snugly fitting in said housing sleeve, means for indicating the formation of ice on the exterior of said housing sleeve including means within said core and extending to and through said housing sleeve, and an electric heating coil embedded in said core for melting the ice on the exterior of said housing sleeve.

4. An ice detecting probe adapted to be projected into an air stream comprising a mounting, a housing sleeve, a core snugly fitting in said housing sleeve, means for indicating the formation of ice on the exterior of said housing sleeve including means within said core and extending to and through said housing sleeve, said means extending longitudinally of said core and beyond said mounting, and an electric heating coil embedded in said core for melting the ice on the exterior of said housing sleeve and to heat said core.

5. An ice detecting probe adapted to be projected into an air stream comprising a mounting, a housing sleeve, a core snugly fitting in said housing sleeve, and means for indicating the formation of ice on the exterior of said housing sleeve including means within said core and extending to and through said housing sleeve to the exterior surface thereof and disposed longitudinally within said core and beyond said mounting, said means including an electric heating coil embedded in the surface of said core for melting the ice thus forming on the exterior of said housing sleeve, said core having a peripheral groove running substantially from end to end thereof for receiving said heating coil and disposing the same in close proximity to said housing sleeve and said core to instantaneously heat said sleeve and said core.

6. An ice detecting probe having a trailing edge and a leading edge adapted to be projected into an air stream comprising a mounting, a housing sleeve, a solid metallic core snugly fitting into said housing sleeve, said housing sleeve having transverse openings therein exposed both to said trailing and to said leading edges, said core having longitudinal and transverse passages therein in communication with said transverse openings in said housing sleeve, and heating means in said core to heat said sleeve and said core.

References Cited in the file of this patent
UNITED STATES PATENTS

| | | |
|---|---|---|
| 2,229,740 | Helmore | Jan. 28, 1941 |
| 2,487,326 | Freeman | Nov. 8, 1949 |
| 2,619,580 | Pontiere | Nov. 25, 1952 |
| 2,647,196 | Carpenter et al. | July 28, 1953 |
| 2,675,456 | Cleminson et al. | Apr. 13, 1954 |
| 2,699,537 | Sederstrom | Jan. 11, 1955 |